United States Patent
Germond et al.

[15] 3,664,517
[45] May 23, 1972

[54] ARTICULATED MASTER-SLAVE MANIPULATOR

[72] Inventors: Jean-Claude Germond, Paris; Jean-Pierre Guilbaud, Jouars-Pont-Chartrain; Jean Vertut, Paris, all of France

[73] Assignee: Commissariat A L'Energie Atomique, Paris, France

[22] Filed: Sept. 28, 1970

[21] Appl. No.: 76,139

[30] Foreign Application Priority Data

Oct. 3, 1969  France...................................693381 1

[52] U.S. Cl........................................................214/1 CM
[51] Int. Cl. ................................................................B25j 1/02
[58] Field of Search...............................................214/1 CM

[56] References Cited

UNITED STATES PATENTS 3,391,801   7/1968   Haaker...............................214/1 CM
3,314,552   4/1967   Vertut................................214/1 CM Primary Examiner—Gerald M. Forlenza
Assistant Examiner—George F. Abraham
Attorney—Cameron, Kerkam & Sutton

[57] ABSTRACT

An articulated master-slave manipulator comprises a master assembly and a slave assembly articulated to opposite ends of a tube extending through a wall.

The slave assembly comprises a first segment and a second segment which are disposed in that order from the tube which extends through the wall, whereas the master assembly comprises, from its articulation to the tube, a top second half-segment which drives the slave-assembly second segment, a first segment which drives the slave assembly first-segment, and a bottom second half-segment, parallel to the top second half-segments.

8 Claims, 10 Drawing Figures

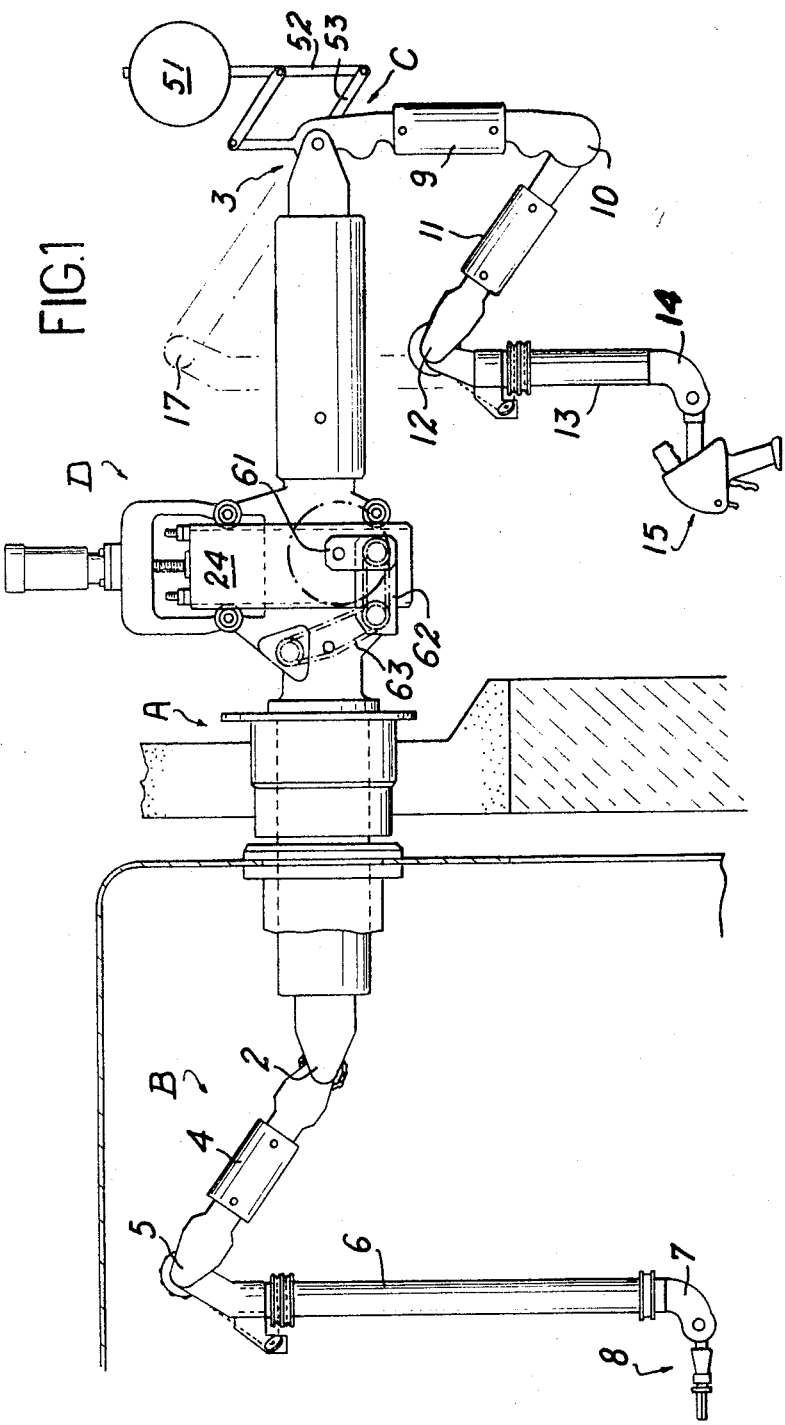

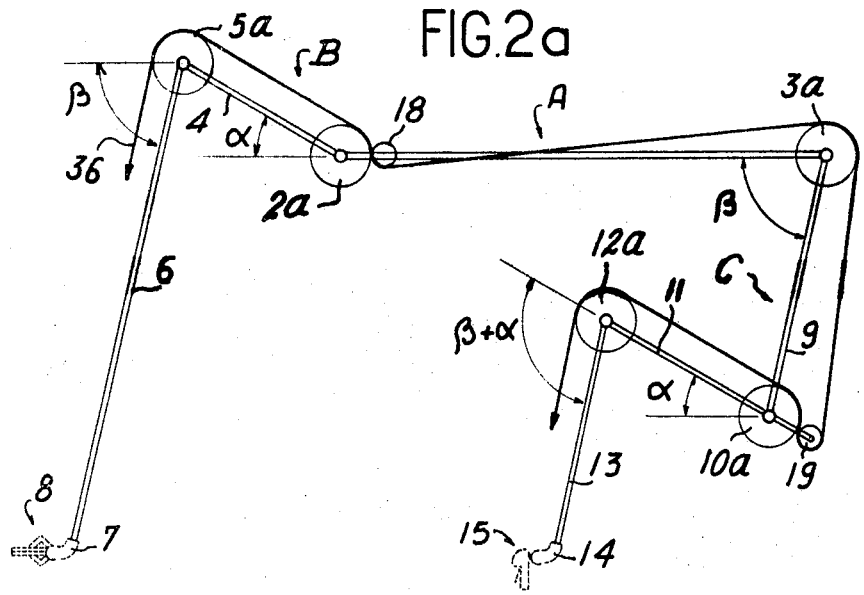
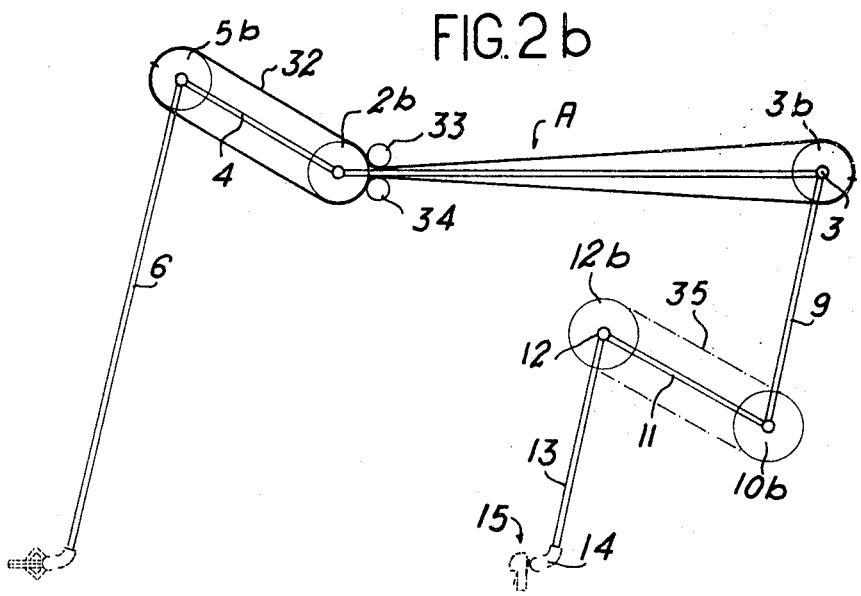

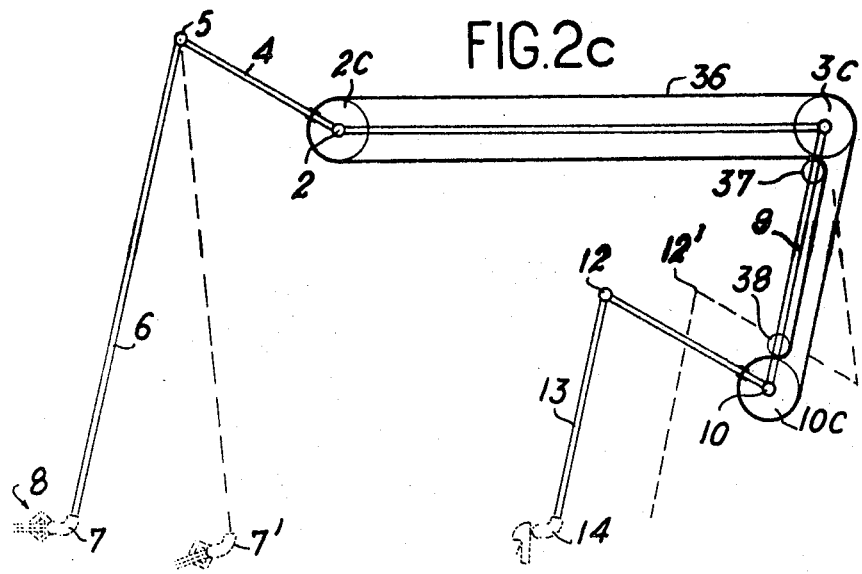
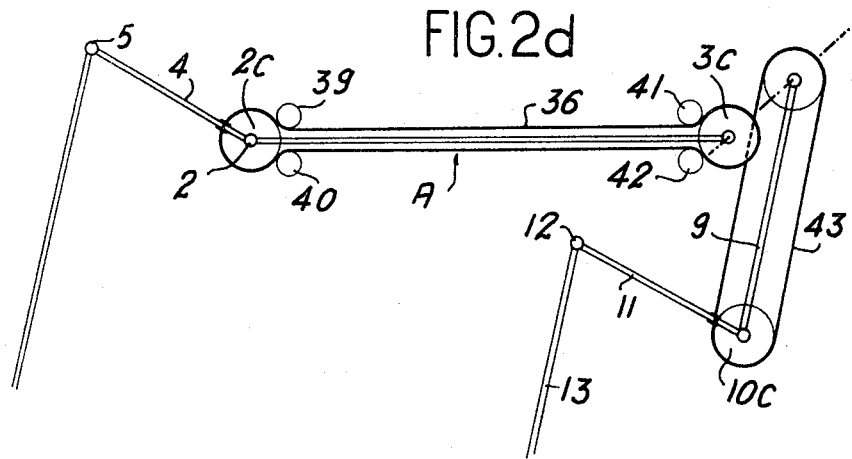

ARTICULATED MASTER-SLAVE MANIPULATOR

This invention relates to articulated master-slave manipulators comprising an operator-controlled master assembly for actuating a slave assembly. Each assembly consists of consecutive segments and each master-assembly segment drives a corresponding slave-assembly segment.

In one known kind of such manipulators each assembly comprises two segments. For obvious reasons the term "shoulder" is used to denote the articulation of the master assembly to a tube which extends through a wall and which connects the master assembly to the slave assembly, while the term "elbow" is used to denote the articulation between the second segment and the first segment. In conventional master-slave manipulators of this kind the actuation was from the master shoulder to the slave shoulder and from the master elbow to the slave elbow. Also, in manipulators comprising a first telescopic segment, the master telescopic segment actuated the slave telescopic segment.

The above arrangement, in which the corresponding segments are disposed in the same order in the master assembly and in the slave assembly, has disadvantages in some cases, for example in the case of manipulators not having a telescopic movement. The disadvantages arise mainly from the limitation of the angular movements between consecutive elements, for instance, of the first segment relatively to the tube through the wall and of the second segment relatively to the first segment, for if the corresponding segments of the master and slave assemblies have motions in the same direction, the shoulders of these assemblies are disposed in opposite configurations relatively to the wall. Consequently each segment is stopped and limits the movements of one assembly while the corresponding segment of the other assembly stays free; for instance, if the maximum amplitude of the master assembly shoulder movement is reached by a 60° movement forwards, the slave assembly comes to a stop position for the same position to the rear, so that the total movement is limited to 120°.

This disadvantage is only partly overcome by indepth offsetting devices for moving one assembly as a unit while the other remains stationary.

It is an object of this invention to provide an articulated master-slave manipulator which is more satisfactory in practice than the prior art devices, in that it has few, if any, of the disadvantages just mentioned. The invention accordingly provides a manipulator comprising an articulated master assembly and an articulated slave assembly borne by the opposite ends of a tube extending through a wall, wherein each assembly comprises at least two segments, and the order of the segments having corresponding movements differs as between the master assembly and the slave assembly.

According to a feature of the invention, if the slave assembly comprises a first segment and a second segment which are disposed in that order from the tube which extends through the wall, the master assembly comprises from its articulation to the tube, such articulation being called the shoulder articulation, a top second half-segment, a first segment and a bottom second half-segment, and means are provided to transmit the movements of the first master segment to the first slave segment and the simultaneous movements of the two master second half-segments to the second slave segment.

The slave assembly can in this case be considered to comprise a shoulder and an elbow, the slave shoulder being actuated by the master elbow (articulation between the top second half-segment and the first segment), while the slave elbow is actuated by the master shoulder (articulation between the tube through the wall and the top second half-segment). In this system, means are provided to maintain the two second half-segments in a fixed angular position relative to one another (as a rule, parallel to one another).

For the sake of simplicity, in the definition just given and in the definition given hereinafter any two segments which actuate one another will be given the same number — i.e., the first master segment always actuate the first slave segment.

The invention also comprises other features which can, with advantage, be used in association with the features previously outlined but which can also be used independently and which will become more clearly apparent from the following description of a two-segment master-slave manipulator forming an exemplary non-limitative embodiment of the invention.

The description refers to the accompanying drawings wherein:

FIG. 1 is a diagrammatic view of the manipulator in elevation;

FIG. 2a is a diagram showing the transmission stringing or cabling from the operating handle to the grasper for the manipulator shown in FIG. 1, in which corresponding segments of the master assembly and slave assembly have identical angular movements;

FIG. 2b is a view similar to FIG. 2a and shows the transmission stringing controlling the movements of the second segment of the slave assembly (elbow movement);

FIGS. 2c and 2d are similar views to FIG. 2a and show two variations of the stringing controlling the movements of the first slave segment (shoulder movement);

Figure 3A:
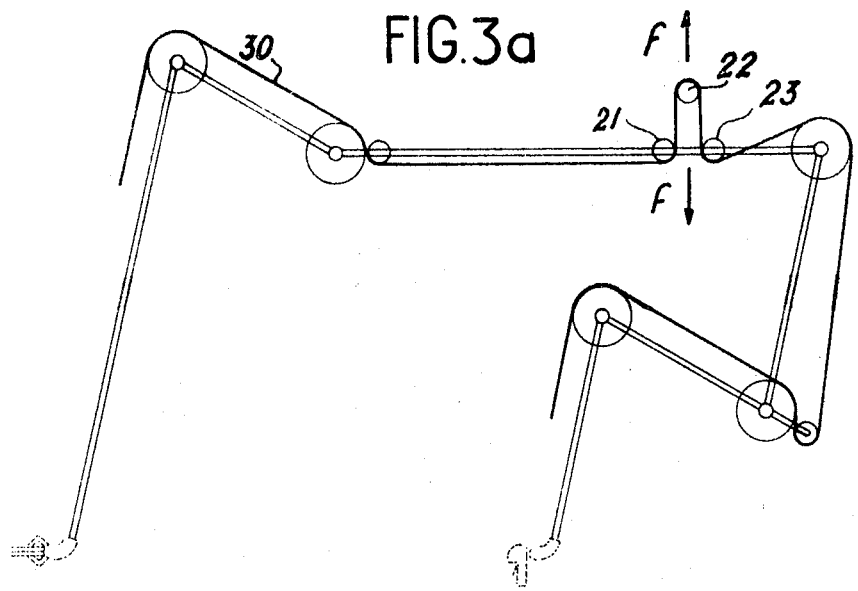
FIGS. 3a and 3b are diagrams showing the in-depth shifting parts of the device associated with the wrist joint actuation and the elbow actuation.

The manipulator of which an overall view is given in FIG. 1 can be considered as consisting of a tube A extending through a wall providing shielding against dangerous materials contained in a cell bounded by the wall, of a slave assembly B in the cell and of a master assembly C outside the cell. The tube A has at its ends a slave shoulder articulation 2 and a master shoulder articulation 3, neither of which need describing since they can be conventional.

The slave assembly comprises a first segment 4 connected by the shoulder articulation 2 to the tube A and by an elbow articulation 5 to a second segment 6 which moves in the plane defined by tube A and the first segment 4. The end of the second segment 6 has a wrist joint 7 bearing a grasper 8. Advantageously, the second segment 6 comprises two members which can rotate relatively to one another so that the gripper 8 can be oriented (azimuthal movement). This movement is combined with the normal two degrees of freedom of the joint 7. This feature is conventional and for a full description reference can if necessary be made to U.S. Pat. No. 3,314,552 and U.K. Pat. No. 1,097,800.

The master assembly C comprises, starting from the shoulder joint 3, a half-segment 9 which corresponds to the second segment 6 of the slave assembly and which will therefore be called hereinafter the "top second half-segment." The half-segment 9 terminates in an elbow joint 10 bearing a segment 11 which corresponds to the slave segment 4 and which will therefore be called the "first master segment." Secured to the other end of segment 11 by an articulation 12, which can be considered to be a pseudo-shoulder joint, is a half-segment 13 which bears, with the interposition of a wrist joint 14, an operating handle 15. Means which will be described hereinafter keep half-segment 13 parallel to half-segment 9, and so half-segment 13 will hereinafter be called the "bottom master second half-segment." The half-segment 13 is adapted to be orientable around its axis (azimuth movement) in the same way as is the second segment 6 of the slave assembly.

Advantageously, the master bottom half-segment can comprise two members relatively rotatable to one another as an auxiliary feature to enable the articulated master assembly to move out of a plane defined by the tube A and the articulated slave assembly, to provide a lateral shift.

The chain-dotted lines in FIG. 1 indicate how matters would be if the first segment 11 were directly connected to the shoulder joint 3. Clearly, what actually occurs in FIG. 1 is that the second segment of the master assembly (the second segment corresponding to the slave assembly forearm) has been placed before the first segment (corresponding to the arm proper). This inversion makes the system mechanically feasible, whereas the system indicated by the chain lines would be mechanically impossible since the elbow 17 of an assembly devised as a copy of the slave assembly would have to pass through the tube A. If the master part of tube A were given a crook-like shape the feature just mentioned could be devised mechanically, but the system would of course be very bulky.

One of the advantages provided by the invention is the increased movement possible for the first segment 4 of the slave assembly B, for segment 4 can move through an angle of at least about 60° equally readily above and below the (normally horizontal) axis of tube A without the master assembly elbow 12 abutting the tube A. Other advantages of the invention will become apparent hereinafter in respect of construction and stringing.

The transmission of movements from master assembly C to slave assembly B will now be described with reference to FIGS. 2a, 2b and 2c. The actuating actions of the grippers (movement of wrist joint 7 and clamping of gripper 8) are produced at the handle 15 and wrist joint 14 by elements which can be conventional and which will therefore not be described. FIG. 2a just shows the outline of one of the flexible transmission members along the segments of the master and slave assemblies. In the cabling or stringing diagram shown in FIG. 2a, the pulleys on the pivot spindles have the same reference as the spindles plus the postscript a. Although a single flexible transmission element 30 is shown, more than one such element, in the form of tapes or cables or chains, are of course provided to transmit the movements of handle 15 to gripper 8, since four movements are normally required— grasper opening and closure, orientation of the wrist joint 7 around two axes perpendicular to one another, and rotation of the second segment 6.

Each flexible member 30 goes from the slave gripper 8 over a slave elbow pulley 5a and a slave shoulder pulley 2a. An extra guide pulley 18 mounted on the tube A maintains in engagement with pulley 2a that run of the or each member 30 which departs from pulley 2a even when segment 4 is above the alignment of tube A—i.e., in fact above the horizontal. Member 30 then runs over a master shoulder pulley 3a followed by a slave elbow pulley 10a. An extra idler pulley 19 mounted on the first segment 11 to keep the member 30 in constant engagement with the pulley 10a is interposed between the pulleys 3a and 10a. The member 30 then runs over pulley 12a of the master pseudo-shoulder. In FIG. 2a the member 30 goes above all the pulleys of the articulations (pulleys 5a, 2a, 3a, 10a and 12a) and this direction of use will be considered to be the positive direction.

The total length of the member 30 must not of course change as a result of the associated deformations of the articulated master and slave assemblies. This problem will now be considered. Accordingly, the reference $\alpha$ will be used to denote the angle of the first slave segment 4 relatively to the axis of the tube A and the reference $\beta$ will be used to denote the angle of the second slave segment 6 to the tube axis. It will first be assumed that the corresponding segments of the master and slave assemblies are parallel.

The condition just mentioned can be rotated in the form that the total length of the flexible transmission member 30 is to remain invariable whatever the values of $\alpha$ and $\beta$. In other words, the sum of the amounts of member 30 wound around the pulleys must be independent of $\alpha$ and $\beta$. Now:

Portion of member 30 wound around pulley 5a of radius R5 : $R5(\alpha+\beta)$

Portion of member 30 wound around pulley 2a of radius R2 : $-R2\alpha$

Portion of member 30 wound around pulley 3a of radius R3 : $-R3\beta$

Portion of member 30 wound around pulley 10a of radius R10 : $-R10(\alpha+\beta)$ Portion of member 30 wound around pulley 12a of radius R12 : $R12(\alpha+\beta)$ This condition therefore implies the simultaneous existence of the two following conditions;

$$(R5 - R2 - R10 + R12 = 0 \quad (1)$$
$$(R5 - R3 - R10 + R12 = 0 \quad (2)$$

This means using the same value R for R2 and R3 and also having:

$$R5 - R = R10 - R12$$

These conditions can be made clearer by stating that the master and slave shoulder pulleys 2a and 3a must have the same radius as one another and the difference between the radii of the first slave segment pulleys—i.e., the elbow pulley 5a and the shoulder pulley 2a—must be equal to the difference between the radii of the corresponding pulleys of the corresponding master segment—i.e., the elbow pulley 10a and the psuedo-shoulder pulley 12a. These conditions are realized when all pulleys are of the same diameter. This is the simplest and best solution of the problem.

It has so far been assumed that any rotation of any master-assembly segment through an angle $\alpha$ or $\beta$ produces an identical rotation of the corresponding slave-assembly element. On the other hand, a manipulator is possible wherein the first slave segment is rotated to the same hand as the corresponding master segment but with a reduction or amplification factor P whereas the second slave segment is moved with a reduction of amplification factor K. In this event formulae 1 and 2 hereof are replaced by the following slightly more complex formulae:

$$P(R5 - R2) - R10 + R12 = 0$$
$$K(R5 - R3) - R10 + R12 = 0$$

leading to :

$$(P-K/K) \cdot R5 - P \cdot R2 + K \cdot R3 = 0$$

When stated in this form the condition shows that if P and K are equal the shoulder pulleys 2a, 3a must still have the same radius as one another.

A point to note about the foregoing formulae is that the winding direction given in FIG. 2a is the only possible one when the factors P and K are equal to one another and possibly equal to unity too, for any direction reversal between any two consecutive pulleys, such as 5a and 2a or 2a and 3a, would make it impossible to verify the foregoing transmission equations. When P and K differ from one another, however, and for some values between them, winding direction reversal between two consecutive pulleys may be necessary to restore the equalities to be verified.

The cabling system shown in FIG. 2a would also be able to transmit movements of the articulation 12a to the elbow articulation 5; to do this, the cable runs extending from the pulleys 5a and 12a to the corresponding wrist joints would have to be completed by return runs to form a closed loop, and pulleys rigidly secured to the corresponding wrist joints would have to be completed by return runs to form a closed loop, and pulleys rigidly secured to the corresponding segments (segment 6 and segment 13) would be needed at 5 and 12. Actually, any such system would have superfluous parts and the system diagrammatically shown in FIG. 2b is preferable, where the pulleys at any articulation have the reference number of such articulation plus the postscript b. In any case, this system comes back to meeting formulae 1 and 2 of the foregoing by using $$R12 = R10 = 0$$

i.e., the cables for transmitting the movement to the slave elbow pulley 5b are directly secured to the pulley 3b. In FIG. 2b a flexible member 32 moves the pulley 5b (if the member 32 is a chain a sprocket is used instead of the pulley 5b). The bottom and top runs of member 32 go over a slave shoulder pulley 2b on which they are retained by two backup pulleys 33, 34 mounted on tube A, whereafter the runs meet on the master shoulder pulley 3b which moves the member 32.

Also, to ensure that the top and bottom half-segments 9 and 13 remain parallel to one another, two pulleys or sprockets 10b and 12b rigidly secured one each to each half-segment are coupled together by a loop 35 in the form of a tape or cable or chain or the like. The two half-segments 9, 13 therefore together form the counterpart of the second slave segment 6.

FIG. 2c gives a basic idea of how movements are transmitted to the slave shoulder 2. This system corresponds, in terms of formulae 1 and 2 hereof, to zero-radius pulleys at 5 and 12.

A flexible member 36 in the form of a closed loop runs over a driven pulley 2c (or a sprocket if the member 36 is a chain), then over a master-shoulder reversing pulley 3c and over a drive pulley 10c which rotates solidly with the first master segment 11. Two small-diameter pulleys 37, 38 mounted on half-segment 9 maintain the flexible member 36 in continuous engagement with the pulleys 3c and 10c.

When the slave shoulder transmission is chain-driven, the system shown in FIG. 2d may be useful; this system is a kinetically equivalent variant of FIG. 2c. The chain used as a member 36 runs in a closed loop around the slave-shoulder reversing sprockets 3c, 2c and they are maintained in engagement therewith by idler sprockets 39–42. A second endless chain 43 connects to sprocket 10c a sprocket 44 which rotates solidly with pinion 3c.

As will be immediately apparent in FIG. 2c and FIG. 2d, no displacement around slave elbow 5 has any effect on the length of the transmission member, for when the wrist joint 7 moves into position 7', the master elbow 10 moves into the position 10' and the master pseudo-shoulder moves into the position 12'. The segment 11, however, remains parallel to itself, and as much of the flexible member unwinds above pulley 3c as is wound on pulley 10c during the same movement.

FIGS. 2b and 2c show another great advantage of the invention additional to the advantage of being able to use pulleys of the same diameter for all the articulations. The extra advantage has to do with the fact that the total transmission length in the drive or actuation for the slave elbow 5 (such drive extending only from the master shoulder 3) is equal to the sum of the length of the tube A and of the length of the first slave segment 4, whereas the transmission length in the drive or actuation for the slave shoulder is equal to the sum of the length of the tube A and of the length of the top second half-segment 9. In fully symmetrical manipulators, however, the elbow-to-elbow transmission length is very much greater than the shoulder-to-shoulder transmission length. The fact that these lengths are equal makes the manipulator much stiffer, more particularly as regards the elbow movement.

Yet another advantage has to do with the fact that the top runs going over the slave shoulder pulley (pulleys 2a, pulley 2b, pulley 2c) all act on the first slave segment 4, and so all the flexible transmission elements participate in the force applied to the slave shoulder. The slave shoulder is the articulation which may have to withstand maximum torque (when the system 4–6 is fully extended horizontally). This sharing of the force is due to the slave shoulder (FIG. 2c) and slave elbow (FIG. 2b) drives, but there is an appreciable effect too due to the action of the cabling system shown in FIG. 2a (as a rule, four cables for the wrist joint and grasper and two cables for the azimuth orientation shown in FIG. 1).

Consequently, in the first place the flexible elements transmitting the movement of the shoulder 2 and the movement of the slave elbow 5, since they run over pulleys or sprockets of the same diameter, can be embodied by cables of identical cross-section or by identical chains; otherwise the pulley 2c would have to be larger than the pulley 5b, which transmits the torque to the elbow 5, to transmit the torque to the slave shoulder. The addition of the two transmissions in their reaction around the set of pulleys rotating around the shoulder articulation 2 helps to obviate these disproportional factors and to reduce considerably the diameter of the tube A in which all these pulleys are disposed near the slave shoulder 2. In the second place, the fact that the torques are equal, plus the fact that all the transmission pulleys disposed at the slave shoulder articulation 2 are of the same diameter, has an effect on the in-depth offsetting mechanism with which the master-slave manipulator just described is, with advantage, provided. The latter mechanism is adapted to move all or some of the slave assembly 3 as a whole without any corresponding movement of the master assembly.

To achieve this movement, the length of an open loop interposed on the path of the flexible transmission members is varied. For example, an offsetting device of the kind described in French patent application No. EN 6,933,810 of Oct. 3, 1969 can be used.

A brief description will now be given, with reference to FIGS. 3a and 3b, of such an offsetting device, which is disposed on the tube A on the master side and outside the wall through which the tube extends.

FIG. 3a, which is similar to FIG. 2a, shows that part of the offsetting device D which is associated with the flexible member 30. The same, which represents the various cables or tapes or chains for transmitting the azimuth movements of the second segment, the wrist-joint displacements and the opening and closure of the grasper, runs over a deflecting pulley 21, a movable offsetting-control pulley 22 and a deflecting pulley 23. The pulleys 21, 23 are so disposed that the runs reaching the pulley 22 are parallel. Clearly, if the train of pulleys 22 (one pulley per cable or chain) is moved in the direction indicated by the arrow $f$ or in the opposite direction, the length of all such cables or chains is varied simultaneously and so a rotation occurs around an articulation (elbow or shoulder).

Figure 3B:
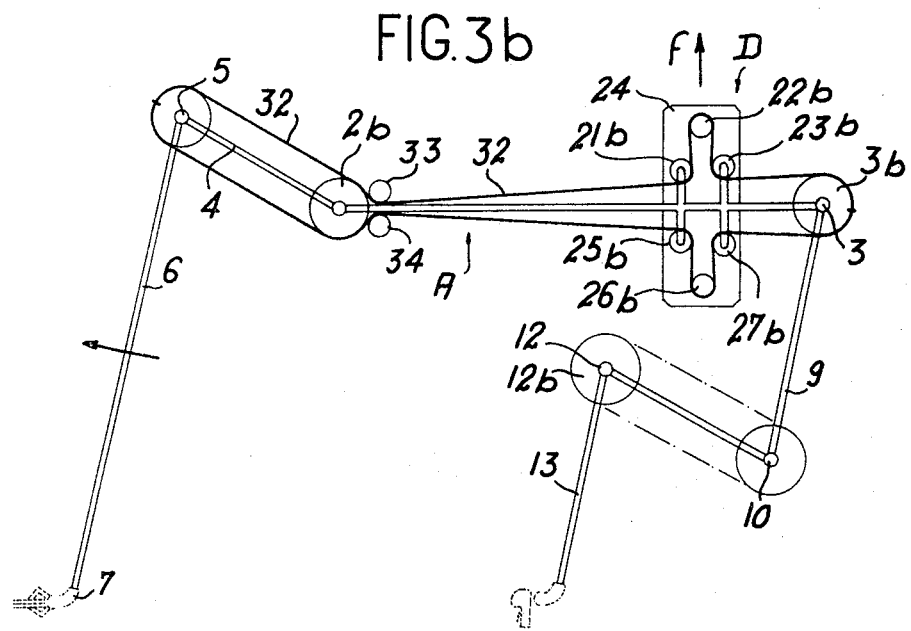

Similarly, and as can be seen in FIG. 3b, the top run of the flexible member transmitting the slave elbow movement runs over a moving pulley 22b similar to the pulley 22 so that the length of all the cables bearing on the pulleys 22 and 22b can be varied and the slave assembly pivoted.

Figure 6:
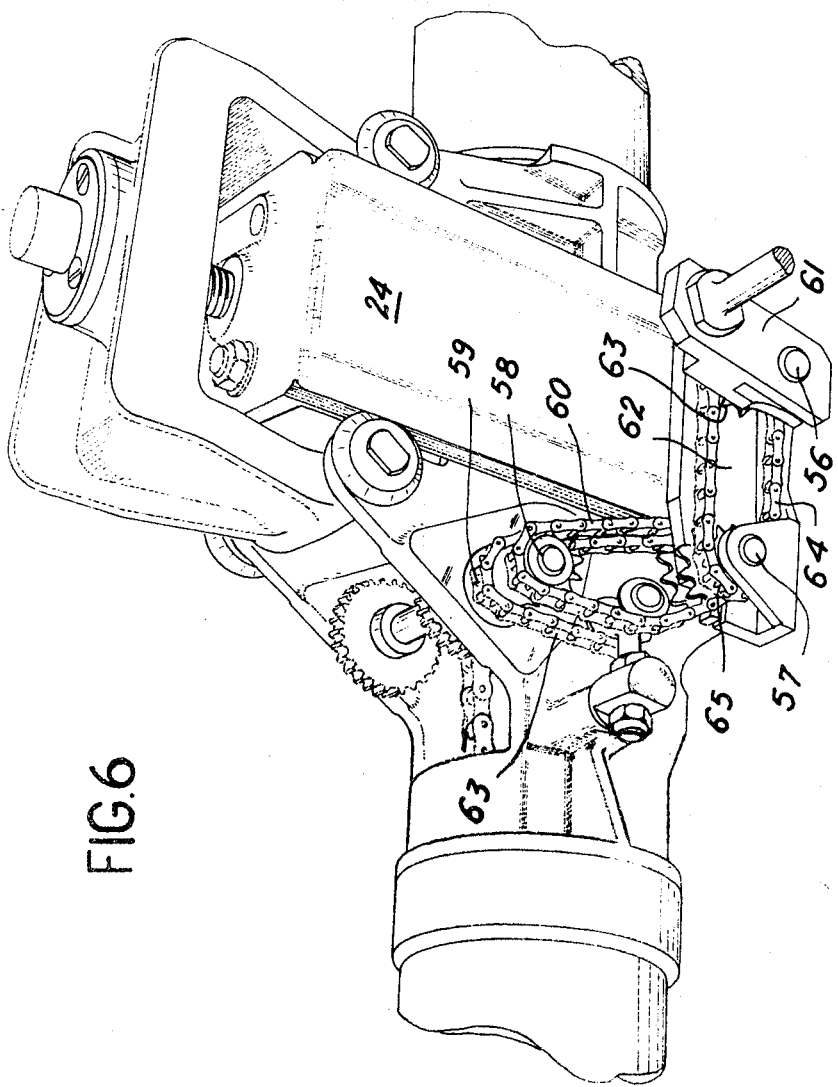

Two different cases must now be considered. To produce an in-depth offsetting by pivoting of the second segment 6 of the slave assembly around the elbow joint 5, the flexible transmission 36 which actuates the slave shoulder 2 must extend freely from pulley 2c to pulley 3c —i.e., there is no change from what is shown in FIG. 2c. In this case the movement of the pulley set 22 and 22b in the direction $f$ and in the opposite direction does not alter the length of the top run of the flexible member 36 and the first slave segment 4 does not change its orientation. However, when, as is the usual case, it is required to produce the in-depth offsetting by the whole slave assembly B being pivoted around the slave shoulder joint 2, the top run of the member 36 is extended over two stationary guide pulleys similar to the pulleys 21b, 23b and, between the same, over an adjusting pulley adapted to shift together with the pulleys 22, 22b. All the flexible transmission members required to provide a positive actuation (including the members 32 and 36) must have on each bottom run a facility which is the opposite of the facility associated with the top run. For instance, the member 32 of FIG. 3b goes over two stationary guide pulleys 25b and 27b and, between the same, over an adjusting pulley 26b. The latter must move simultaneously with the pulley 22b. A simple solution is to dispose all the adjusting pulleys on a single slide 24 adapted to move transversely of the tube A. The slide 24 can be of the kind shown in FIG. 6 and be embodied by a U-shaped stirrup-like member having in its cross-member a screwthreaded nut-like member in which a screwthreaded rod is screwed; such rod is so secured in the stationary plate as to be unable to shift and can be rotated by a motor (not shown).

For practical reasons, the adjusting pulleys associated with any single run are not all disposed on the same axis but are disposed on two trains or sets of axes offset parallel to the axis of the tube A. Advantageously, each pulley is mounted in an independent yoke whose position on slide 24 can be adjusted in the direction of the arrow $f$ to adjust the tension of the corresponding run.

Since the manipulator has an in-depth offsetting facility, the master assembly and the slave assembly must be balanced independently. Due to the asymmetrical arrangement of these assemblies, the relatively simple device can be used which forms the subject matter of the above mentioned French patent application.

Figure 4:
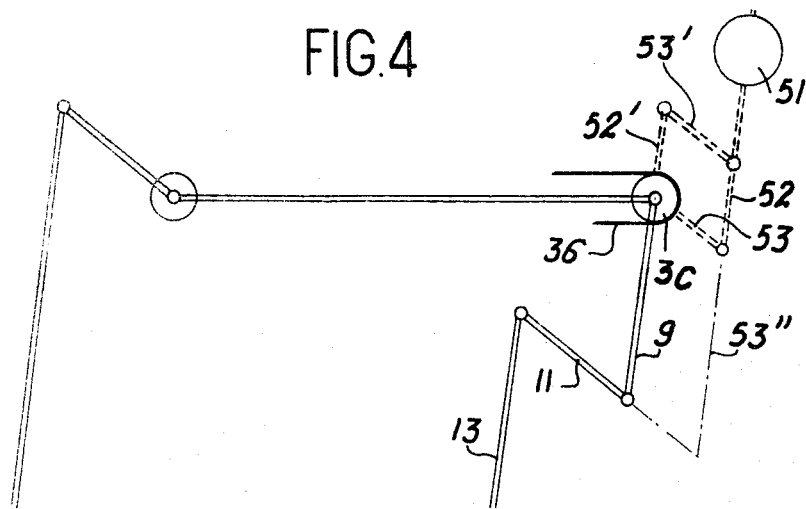
FIG. 4 is a diagram of the balancing system for the master assembly.

As can be seen in FIG. 4, the master-arm balancing facility comprises a counterweight 51 and a set of rods forming a deformable parallelogram which maintains the counterweight in a position constantly homothetic in relation to the position of the master-assembly center of gravity relatively to a fixed axis. The parallelogram comprises a lever 52 articulated to a rod 53 rigidly secured to the pulley 3c (or corresponding sprocket in the case of a chain drive). A link 53' and an extension 52' of the top second half-segment 9 complete the parallelogram.

If the top second half-segment 9 can make an auxiliary rotation, the balancing parallelogram must of course follow such segment in such movement, in which event the drive can be by way of a rod, as 53'', which extends the segment 11.

The slave assembly (FIG. 5 and FIG. 6) is balanced similarly by a counterweight 55 disposed on the master side of the wall. Counterweight 55 is associated with a linkage forming a deformable articulated system which reproduces the the geometry of the master-assembly segments. Counterweight 55 is mounted on a first rod 61 pivoted to a second rod 62 for movement around a pivot pin 56. Rod 62 rotates around a stationary pivot pin 57.

Figure 5:
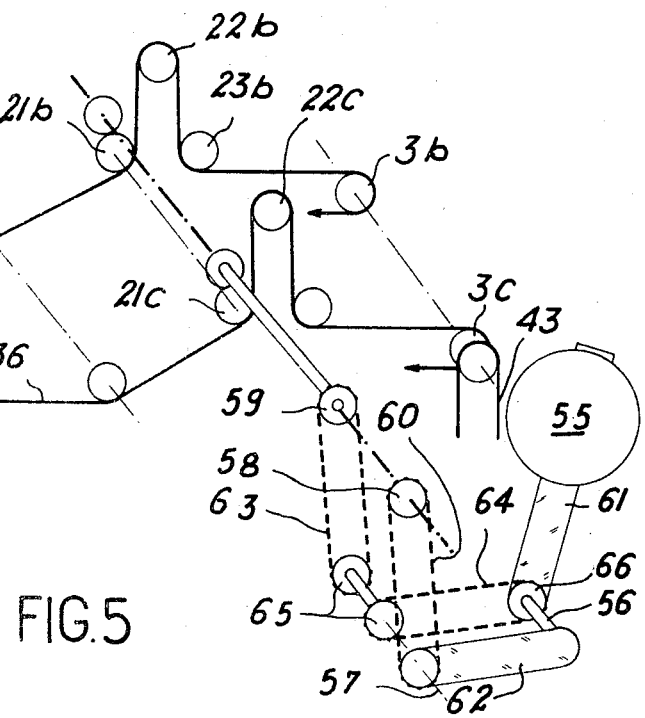
FIGS. 5 and 6 are a diagrammatic view (FIG. 5) of the balancing system of the slave assembly and a perspective view (FIG. 6) showing the main items of the system shown in FIG. 5.

The transmission mechanism for reproducing by its action on the rods 61 and 62 the movements of the first and second slave segments is associated with the offsetting device D. So as not to overload the drawings, all that are shown in FIG. 5 are the top runs of the flexible transmission members 32, 36. The pulley 21b over which the member 32 runs rotates when an in-depth offset is made by movement of the moving pulley 22b. The orientation of pulley 21b is therefore associated with the position of the slave elbow 5. If a chain transmission is used and the pulley 21b is a sprocket (the case shown in FIG. 6), there can be no slip and the reproduction of the movement is strictly accurate. A reversing gear train reproduces outside the box containing the offsetting device the position of the second slave segment on a drive sprocket 58 which is also outside such casing. The pulley 21c, which is disposed similarly to the pulley 21b on the flexible member 36, drives through a reversing gear train of appropriate transmission ratio a drive sprocket 59 which reproduces the position of the first slave segment outside the casing. The sprocket 58 drives a chain 60 which drives a sprocket; the same is of the same diameter as the sprocket 21b and is rigidly secured to the rod 62 and rotates the same around the spindle or pin 57 (reproduction of the slave-shoulder movement). Similarly, the sprocket 59 drives through two chains 63, 64 and a pair of relay sprockets 65 a sprocket 66 rigidly secured to the rod 61, which is rotated around the pivot pin or spindle 56 (reproduction of the elbow movement).

Clearly, the transmission just described imparts to the counterweight 55 angular movements which reproduce the angular movements of the slave wrist-joint and the separate balancing of the slave assembly.

The balancing facility just described can be used as an element for driving the sprockets 21b and 21c. The sprockets 23b and 23c could be used similarly to control the movements of the counterweight 51. This variant, which lightens the weight of the part overhanging from the wall by bringing the mass 51 nearer the wall, may be advantageous in some cases.

We claim:

1. An articulated master-slave manipulator comprising a master assembly and a slave assembly articulated to opposite ends of a tube extending through a wall, each assembly including first and second segments connected in series, one of said segments of one of said assemblies being drivingly coupled to one of said segments of the other of said assemblies, and said first and second segments of one of said assemblies having corresponding movements with said first and second segments respectively of the other of said assemblies being disposed in reverse order with respect to said segments of the other of said assemblies.

2. An articulated master-slave manipulator having a wall transversing tube, a master assembly articulated to one end of said tube, a slave assembly articulated to the other end of said tube, said slave assembly having a first segment articulated on said tube and a second segment connected to said first segment so as to pivot on said first segment, said master assembly having an upper portion of a second segment articulated on said tube, a first segment pivotally connected on said second segment portion and a lower portion of said second segment pivotally connected to said first segment, means for drivably connecting said second segment of said slave assembly to said upper portion of said second segment of said master assembly and for connecting said first segment of said slave assembly to said first segment of said master assembly, and means for maintaining said two portions of said second segment of said master assembly in a predetermined angular position.

3. A manipulator according to claim 2 including means for maintaining said lower and upper second segments parallel.

4. A manipulator according to claim 2, including means for controlling the movement of said second slave segment having an endless flexible member running over a pulley secured to said second slave segment to rotate the same around its articulation to said first segment, said flexible member also going over a pulley disposed on said first segment at the articulation thereof to said tube, said flexible member also going over a pulley disposed on said master upper second segment, said last-mentioned pulley being rotated by said last-mentioned second segment around its articulation to said tube.

5. A manipulator according to claim 4, including means for controlling the movements of said first slave segment having an endless flexible member which goes over a pulley secured to said first slave segment to rotate the same around its articulation to said tube; a pulley disposed on said master upper second segment at the articulation thereof to said tube; and a pulley disposed on said master first segment, said latter pulley being rotated by said last-mentioned first segment around its articulation to said upper second segment.

6. A manipulator according to claim 2, including means for in-depth movement of said slave assembly including a set of pulleys movable in a direction transversely of the axis of said tube to vary the length of each run of at least one of said flexible members by equal and opposite amounts for the two runs of any single flexible member.

7. A manipulator according to claim 2, including separate balancing means for each of said assemblies disposed at the end of said tube on said master-assembly side.

8. A manipulator according to claim 7, including a slave assembly balancing means having a counterweight maintained in a position homothetic of the position of said slave assembly.

* * * * *